Nov. 10, 1953 V. S. MOSINSKIS 2,658,576
BLADE PITCH CONTROL MECHANISM
Filed March 8, 1951 2 Sheets-Sheet 1

INVENTOR
Vytautas S. Mosinskis

Nov. 10, 1953 V. S. MOSINSKIS 2,658,576
BLADE PITCH CONTROL MECHANISM
Filed March 8, 1951 2 Sheets-Sheet 2

INVENTOR
Vytautas S. Mosinskis

Patented Nov. 10, 1953

2,658,576

UNITED STATES PATENT OFFICE 2,658,576

BLADE PITCH CONTROL MECHANISM

Vytautas S. Mosinskis, Philadelphia, Pa., assignor to Piasecki Helicopter Corporation, Morton, Del., a corporation of Pennsylvania Application March 8, 1951, Serial No. 214,577

2 Claims. (Cl. 170—160.12)

1

This invention relates to means for changing the blade pitch of a rotor provided with flapping and drag hinges, and more particularly to rotors wherein the blade pitch bearing is outboard of the hinges.

The principal object of this invention is to provide a light positive device for changing the pitch of the blades wherein the error introduced by the motion of the blade about its vertical and horizontal hinges is reduced to a minimum.

Another object of this invention is to provide a blade pitch-changing mechanism that will permit the blade to be folded without disconnecting the control mechanism.

These and other objects will become apparent when the following specification is read in conjunction with the accompanying drawings in which.

Figure 1:
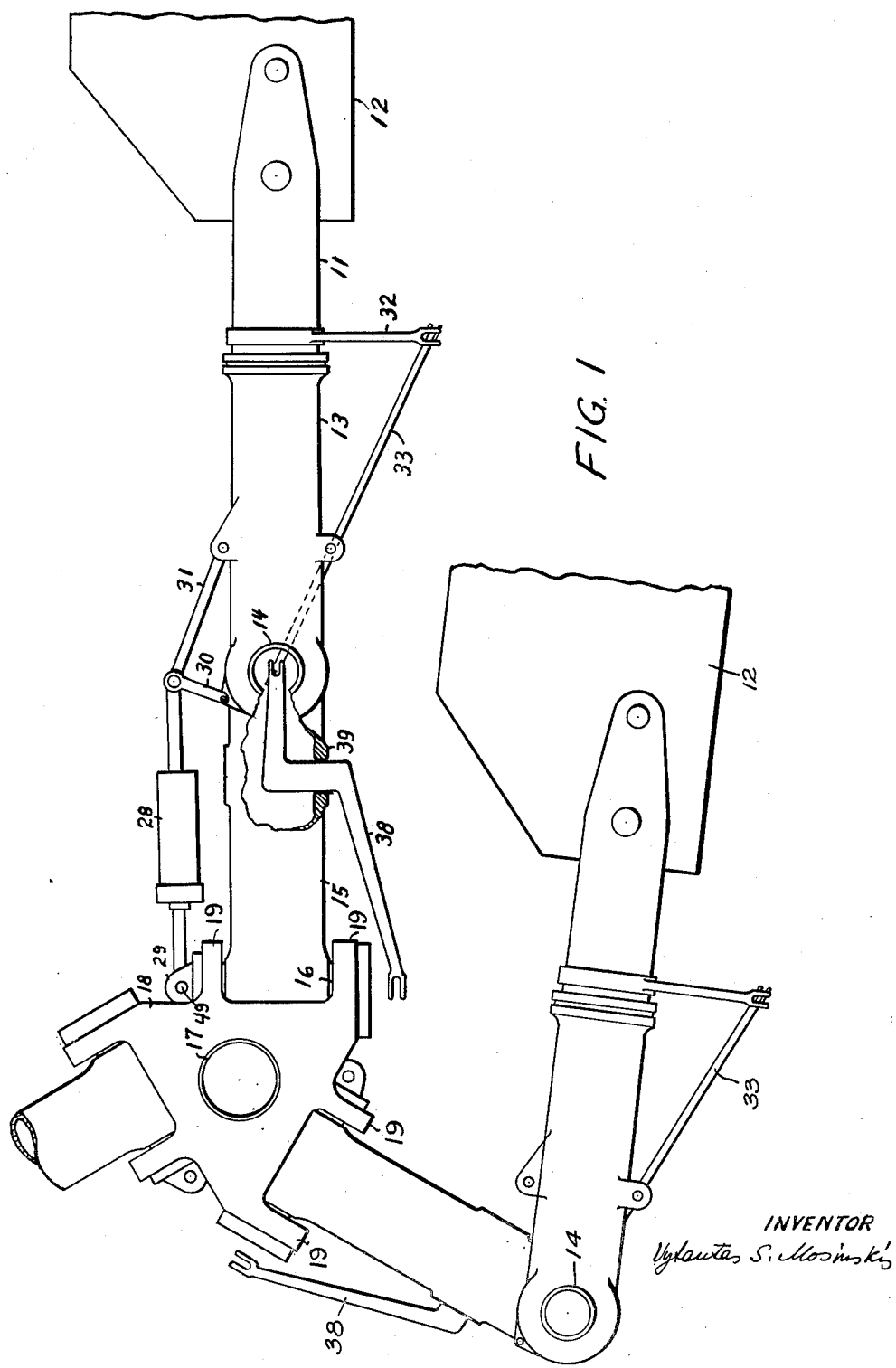
Figure 1 is a plan view of one of the rotors, partially in section showing the pitch changing mechanism in a folded position in one blade and in an unfolded position in another blade.

Referring more particularly to the drawings, numeral 11 indicates the root end of blade 12 which is rotatively carried by pitch bearing member 13. The non-rotative portion of the pitch bearing member 13 extends inwardly and is pivoted about the vertical pin 14 to permit the blade lead or lag in response to aerodynamic forces acting on the blade. Vertical pin 14 is carried by an extension link 15 which is in turn carried by a horizontal pin 16 allowing the blade to flap in a vertical plane about its axis of rotation.

Vertical drive shaft 17 rotates hub 18 which carries a plurality of blades. Although hub 18 is shown carrying three blades spaced radially 120 degrees apart this invention is applicable to a two or multi-blade rotor. Ears 19 projecting from hub 18 carry horizontal pins 16. Swash plate 20 is mounted by spherical bearing 21 for universal tilting action about shaft 17, and is capable of vertical motion upon said shaft. An inner stationary roller bearing race 22 carried by web 23 is affixed to the outer portion of spherical bearing 21. By means of roller bearings 25, outer race 24 is adapted to rotate with respect to inner bearing race 22, said outer race 24 also being connected to rotate with blades 11 about the axis of shaft 17 by means of a linkage to be later described.

Connected to the inner stationary ring 22 by

2 pin joint 27 is rod 26 through which tilting forces are applied to the swash plate. Other similar links, not shown, are provided to raise and lower the swash plate for collective pitch control.

Dampers 28 at one end are connected to rotor hub 18 by brackets 29 and at the other end to links 30, 31 affixed to link 13. Pin 49 attaches the damper 28 to rotor bracket 29 and is removable to permit folding of the rotor blade.

Pitch horn 32 is rigidly fixed to the root end 11 of blade 12. The blade pitch horn 32 is pin connected to one end of a rocking beam 33, which beam is pivoted intermediate its ends to a forkened rod 34 carried by link 13 for pivotal motion with respect thereto. The other end of beam 33 is pin connected to a link 36, containing a swivel connection 37 along its length. Swivel connection 37 comprises a sleeve 45 which houses ball bearings 46 and enlarged head 47 of link 48. The longitudinal axis of link 36 and the swivel joint coincides with the axis of vertical pin 14. Pin-connected to the top of link 36 is a Z-shaped control member 38 carried by extension link 15 for pivotal rotation at boss 39. One arm of the control member is housed within the extension link 15 and passes through a slot 41 in vertical pin 14 for connection with link 36. The other arm of said member is connected to link 40 which is pin-connected to the outer race 24 of swash plate 30 and rotates therewith. The pivotal connection of control member 38 to link 40 coincides with the axis of the horizontal flapping hinge pin 16.

Figure 2:
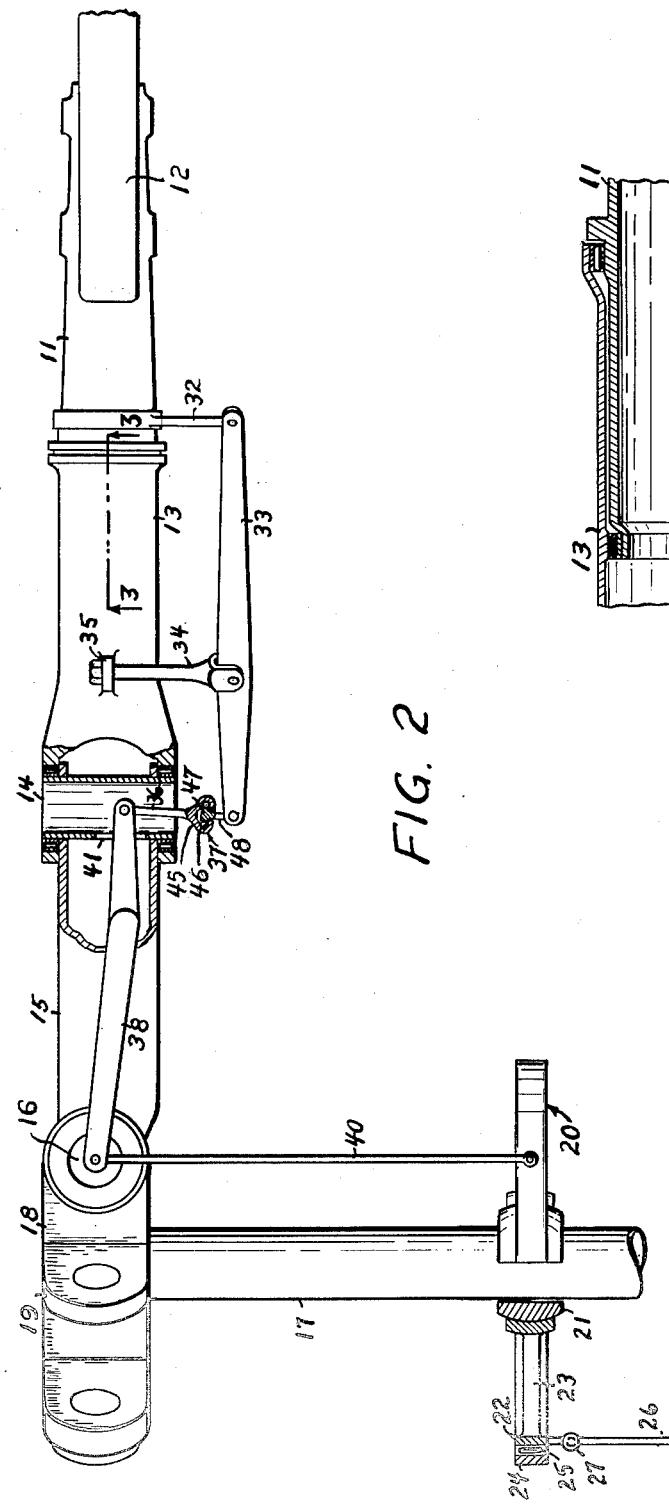
Figure 2 shows an elevation of the blade pitch changing mechanism partially in section.
Figure 3:
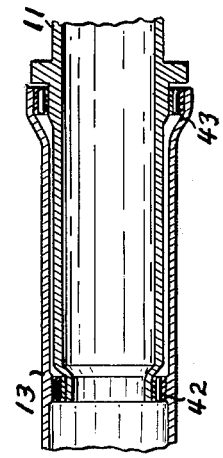
Figure 3 is a sectional view taken along lines 3—3 of Figure 2.

Figure 3 represents a sectional view taken at lines 3—3 in Figure 2. It is seen that root end 11 of blade 12 is telescoped within the stationary portion of pitch bearing member 13 and roller bearings 42 and 43 permit free rotation of root end 11 within the stationary portion of said pitch bearing member.

Operation

The control mechanism is rigged in such a manner that when the blades are in their most used pitch angle, the pivot connection between link 40 and control member 38 is coincident with the axis of the flapping hinges 16. Thus no pitch change motions are transmitted to the blade when it flaps about its horizontal pin 16. Likewise, the pivot connection between control member 38 and link 36 is normally in line with axis of the vertical pin 14 so that no pitch change motion is transmitted to the blade when the blade oscillates about vertical pin 14.

If the pivot connection between link 40 and control member 38 is offset from a point in line with the horizontal hinge 16 due to the inclination of swash plate 20 only a slight pitch change motion would be introduced as the locus of said pivot connection is at all times in close proximity to said horizontal flapping axis.

To fold a blade it is only necessary to remove damper pin 49 and the blade may then be swung rearwardly to the folded position shown in the lower portion of Figure 1 of the drawings.

It is seen that the pitch control mechanism is not disturbed by this operation since control member 38 and link 33 are free to turn with respect to each other by virtue of swivel connection 36 and further it is not necessary to lock the pitch bearing when the blades are folded as no forces are acting to change the pitch of the blade during the folding operation due to locating the pitch bearing member 13 outboard of the vertical hinge 14.

While the preferred embodiment of the invention has been described in detail, it is understood that various changes may be made without departing from the scope of the invention as defined in the appended claims.

I claim:

1. In a rotor system for a helicopter, a hub, an extension link pivoted for flapping to said hub, a pitch bearing member pivoted to said extension link, a rotor blade mounted on said pitch bearing member for pitch change about its longitudinal axis, a pitch horn mounted on said blade to move said blade about said axis, a control member pivotally mounted on said extension link, a rocking beam pivotally mounted on said drag link, a control link connecting the outboard end of said control member to the inboard end of said rocking beam on a line coincident with the axis of the pivot connecting said extension link and said pitch bearing member, the outboard end of said rocking beam being connected to the pitch horn of said blade, the inboard end of said control member being connected to the helicopter controls, said last connection normally being coincident with the axis of the pivot connecting said hub and said extension link.

2. In a rotor system for a helicopter including a rotor shaft, a hub mounted on said shaft, an extension link connected to said hub by a first pivot connection, a pitch bearing member connected to said extension link by means of a hollow pivot connection, a rotor blade pivotally carried by said pitch bearing member for pitch change about its longitudinal axis, a pitch horn mounted on said blade to move said blade about said axis, pitch control means comprising a control member pivotally mounted on said extension link, a rocking beam pivotally mounted on said pitch bearing member, said hollow pivot including a slotted sleeve member, a link connecting the outboard end of said control member and the inboard end of said rocking beam and having a push-pull swivel intermediate its length, said last mentioned link being movable along an axis coincident with the axis of said hollow pivot, the outboard end of said rocking beam being secured to said pitch horn, a control link pivotally connected to the inboard end of said control member, the axis of said last named pivotal connection normally coinciding with the axis of said first named pivot, whereby flapping movement of said blade about said first pivot connection and lead-lag and folding motion about said second pivot connection introduces no pitch change setting in said blade.

VYTAUTAS S. MOSINSKIS.

References Cited in the file of this patent

UNITED STATES PATENTS

| Number | Name | Date |
|---|---|---|
| 1,759,442 | Depew | May 20, 1930 |
| 1,989,544 | Campbell | Jan. 29, 1935 |
| 2,373,575 | Lemonier | Apr. 10, 1945 |
| 2,397,154 | Platt | Mar. 26, 1946 |
| 2,410,459 | Platt | Nov. 5, 1946 |
| 2,428,200 | Campbell | Sept. 30, 1947 |
| 2,430,767 | Hirsch | Nov. 11, 1947 |
| 2,537,623 | Campbell | Jan. 9, 1951 |
| 2,540,473 | Campbell | Feb. 6, 1951 |